United States Patent [19]

Ballocci

[11] 4,212,619
[45] Jul. 15, 1980

[54] PLANT FOR CURING CONVEYOR BELTS AND THE LIKE

[75] Inventor: Giovanni Ballocci, Monza, Italy

[73] Assignee: Industrie Pirelli, S.p.A., Milan, Italy

[21] Appl. No.: 947,189

[22] Filed: Sep. 29, 1978

[30] Foreign Application Priority Data

Sep. 30, 1977 [IT] Italy ............................. 28127 A/77

[51] Int. Cl.² ..................... B29H 3/00; B29H 7/22; B29D 29/00
[52] U.S. Cl. .................................................. 425/373
[58] Field of Search ................. 425/28 B, 34 B, 363, 425/364, 371, 373

[56] References Cited

U.S. PATENT DOCUMENTS

| 1,956,545 | 4/1934 | Schroder et al. | 425/28 B X |
|---|---|---|---|
| 2,082,895 | 6/1937 | Knowland | 425/373 X |
| 2,142,972 | 1/1939 | Bierer | 425/373 X |
| 2,328,909 | 9/1943 | Kilborn | 425/28 B X |
| 2,442,443 | 6/1948 | Swallow | 425/373 |
| 2,649,617 | 8/1953 | Marcy | 425/373 X |
| 2,745,134 | 5/1956 | Collins | 425/373 X |
| 3,594,866 | 7/1971 | Skinner et al. | 425/371 X |
| 3,700,365 | 10/1972 | Spicer et al. | 425/28 B |

Primary Examiner—J. Howard Flint, Jr.
Attorney, Agent, or Firm—Stevens, Davis, Miller & Mosher

[57] ABSTRACT

An assembly of apparatus is provided for curing or vulcanizing an elongated elastomeric belt such as a conveyor belt reinforced with a fabric or other strengthening member while preventing the reinforcing member from shifting in the softened belt from its desired position. The assembly has a curing apparatus comprising a rotating curing drum, a device for continuously feeding an uncured ribbon-like belt to the drum and a device for maintaining tension on the belt as it is fed to the curing drum and for preventing lateral drift of the belt.

2 Claims, 2 Drawing Figures

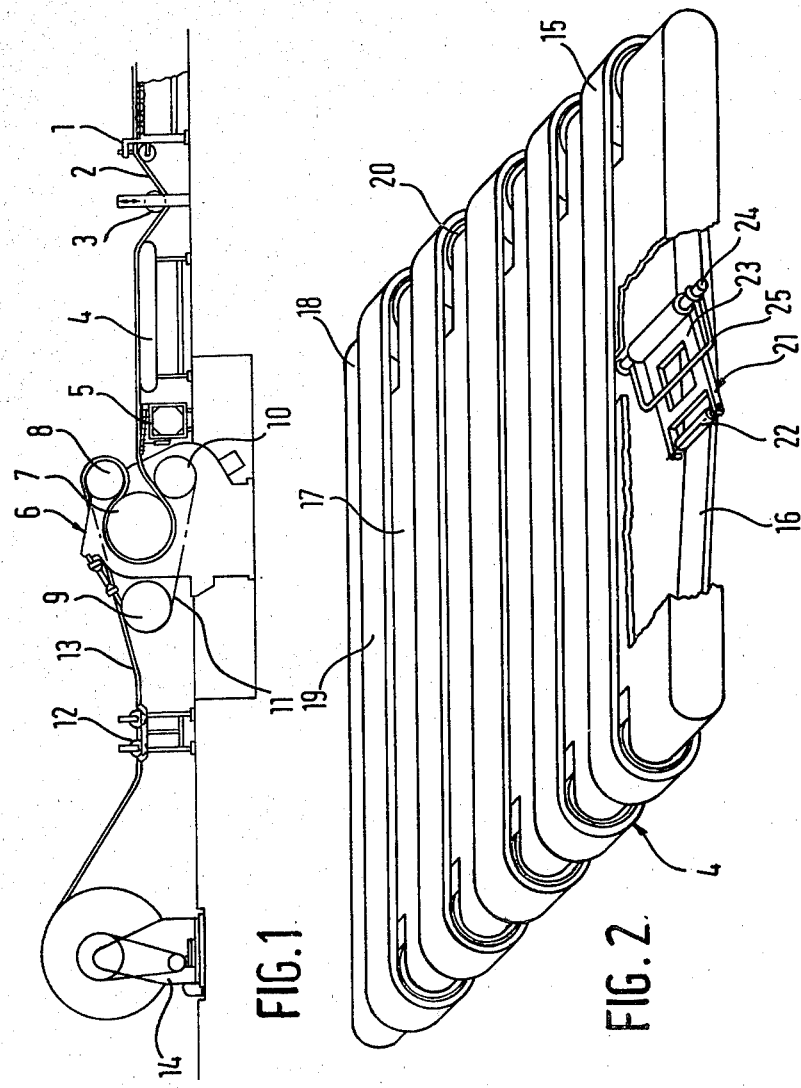

PLANT FOR CURING CONVEYOR BELTS AND THE LIKE

This invention relates to apparatus for curing ribbon-like elements, and more particularly for curing conveyor belts. It also relates to improved apparatus for molding and curing such ribbon-like elements.

In known plants for curing ribbon-like elements having a reinforcing structure embedded therein which utilize continuous curing machines or apparatus of the type having a rotating drum, many problems are encountered in maintaining the coplanarity and the exact location of the longitudinally extending reinforcing element.

When the uncured ribbon-like element enters the continuous curing machine it is subjected to diverse velocities which cause variation in the tension on the longitudinally extending reinforcing element. As a matter of fact, it sometimes happens that the velocity of the continuous curing machine, and consequently that part of the ribbon-like element that is inserted in it, is faster or slower than the velocity at which that portion of the uncured ribbon-like element immediately preceding the continuous curing machine is advancing.

In this case, i.e. with the velocity of the continuous curing machine faster than that of the advancing velocity of the uncured ribbon-like element, the tension on the longitudinal resistant insert increases.

Because the uncured ribbon-like element is wrapped around the curing drum there is an increase in the tension of the longitudinal resistant reinforcing member. Therefore, the longitudinal reinforcing member sinks more deeply into the uncured elastomeric material. This results in the reinforcing member not being in its intended position but on the contrary nearer to one side of the element than was intended.

It follows that, in the cured ribbon-like element, the longitudinal resistant inserts are not found where they ought to be, but they are shifted towards one of the sides of the element. On the other hand, when the velocity of the continuous curing machine is slower than the rate of advancement of the uncured ribbon-like element, folds are formed in the element in the entrance zone leading into the continuous curing machine. Because of these folds, the longitudinal reinforcing member can not maintain its coplanarity and tends to warp either in a plane perpendicular to the ribbon-like elements or in the plane of the ribbon-like element, in which case the reinforcing elements are not parallel or are most likely disposed in almost any plane thereby producing defects both in the parallelism as well as in the positioning on the inside of the ribbon-like element. Such defects lead to a non-uniform product that causes a considerable waste because the product does not conform to specifications. All this occurs independently of the effects of thermal expansion of the material from which the ribbon-like element is formed.

It is an object of this invention to provide an apparatus for curing a ribbon-like element such as a conveyor belt which is devoid of the foregoing disadvantages. Another object of the invention is to provide an improved apparatus for curing such a ribbon-like element.

Still another object of the invention is to provide an assembly of apparatus or a manufacturing plant for vulcanizing or otherwise curing ribbon-like articles of manufacture having longitudinally extending reinforcing insert members for strengthening the element which produces such an element with the reinforcing members correctly positioned in the ribbon-like article with a minimum amount of scrap and a product of uniform structure throughout its length.

Other objects will become apparent from the following description with reference to the accompanying drawing wherein:

FIG. 1 is a schematic illustration of an apparatus for curing ribbon-like elements in accordance with the invention; and FIG. 2 illustrates in a perspective view, partially in section, apparatus for regulating the tension on the uncured ribbon-like element.

The invention thus provides an assembly of apparatus or a manufacturing plant for vulcanizing ribbon-like elements comprising a device capable of continuously feeding an uncured ribbon-like element to a continuous curing machine of the type having a rotating drum, wherein the assembly has disposed between the continuous feeding device and the continuous curing machine a device for regulating the tension of the ribbon-like element.

The device for regulating the tension of the uncured ribbon-like element also includes a means for guaranteeing uniform advancement of the ribbon-like element without any lateral drift thereof.

In the most general form of the invention, the assembly of apparatus or manufacturing plant comprises in the stated order a device capable of continuously feeding the uncured ribbon-like element to a curing device; means for regulating the tension of the uncured ribbon-like element as it is fed to the curing device; and, a continuous curing machine or device of the type having a rotating drum.

The device which regulates the tension of the uncured ribbon-like element can be disposed, for example, in the production line for vulcanizing ribbon-like articles described in Italian Pat. No. 912,586, the disclosure of which are incorporated herein by reference thereto.

The disclosed production line operates according to the process described in the patent and as described in Italian Pat. No. 835,015.

The process involves the steps of extruding a hollow tubular body in which at least one longitudinal reinforcing element is inserted; cutting the tubular body along a generatrix as soon as it is formed; opening the hollow tubular body and flattening it; doubling, if necessary, the covering layers on the ribbon like element; vulcanizing the uncured ribbon-like element by means of a continuous curing machine of the type having a rotating drum that is also provided with an appropriate post-vulcanizing device; and trimming, cutting and collecting the finished ribbon-like element.

The apparatus illustrated in FIG. 1 may be the terminal part of the production line operating according to the just described process.

At the right-hand extremity of FIG. 1 there is present a trimming device 1 onto which the uncured ribbon-like element 2 runs.

Trimming device 1 carries out a paring operation on the excess part of uncured ribbon-like element 2.

Immediately downstream of trimming device 1 is placed a roller 3, the axis of which is continuously mobile in the vertical plane-passing through its own rotating axis, as indicated by the small arrow above roller 3. In series with roller 3, and immediately after it, in the advancing direction of the uncured ribbon-like element 2, there is placed a device 4 (to be described later on in more detail) that represents a particular embodiment of the means capable of regulating the tension on the uncured ribbon-like element 2. Moreover, device 4 is also a particular embodiment of the means that cause the element 2 to advance uniformly and without any lateral drift.

Immediately after device 4, there is placed a flat roller carriage 5 for supporting element 2 between device 4 and the continuous curing machine 6. The curing machine 6 has a molding and vulcanizing drum 7 that provides the vulcanizing heat for ribbon-like element 2, a driving roller 8, tensioning roller 9 and a return roller 10.

A belt 11, closed into a circular form and preferably metallic, is looped around return roller 10 in contact therewith, around drum 7, around the driven roller 8 and around tensioning roller 9.

The uncured ribbon-like element 2 passes between belt 11 and molding and vulcanizing drum 7 of the curing machine 6 during the vulcanizing phase, and it is actually ribbon 11 that provides the pressure to the uncured ribbon-like element 2 during the vulcanizing phase.

Continuous curing machine 6 is provided with a post-vulcanizing device (not shown in FIG. 1) capable of increasing productivity. The post-vulcanizing device is formed, for example, by a particular type of heating oven comprising several mobile elements. This complex is appropriately positioned over the curing machine and connected to the curing cycle of the ribbon-like element.

The function of the post-vulcanizing device is to provide heat to the ribbon-like element for a longer period in such a way as to complete the vulcanizing after the molding and vulcanizing drum.

Immediately after the continuous curing machine 6 there is placed group 12 on which the cured ribbon-like element 13 is trimmed, cut to the desired length and successively wound up on the winding rack 14.

Device 4 is shown in detail in FIG. 2. Device 4 constitutes a particular embodiment of the means for regulating the tension of the uncured ribbon-like element 2 and which also is a particular embodiment of the means that cause said ribbon-like element to advance uniformly without any lateral drift.

Device 4 in its more general form comprises a conveyor belt of suitable transverse dimension, in particular having a width at least equal to that of the uncured ribbon-like element 2, wound around two rollers, one idle and the other one driving.

The velocity of the conveyor belt is determined when in exercise by the velocity of the curing machine 6, i.e. being instantaneously faster or slower than the curing machine in such a manner as to place under suitable tension the longitudinal resistant insert members of the uncured ribbon-like element 2 which directly lie on the conveyor belt.

The device represented in FIG. 2 is a preferred embodiment of the said device.

The device 4 is preferably formed by a plurality of conveyor belts 15, the internal surface 16 of which is treated in a conventional manner known to any one skilled in the art for allowing it to slide with a low friction coefficient onto the upper metallic surface 17 of the metallic shell 18 that encloses device 4.

In this way the upper branches 19 of the conveyor belt 15 all lie on the same plane, thus resulting coplanar. Each single conveyor belt 15 is wrapped around an idle roller 20, and each is also provided with a driving device (not shown in FIG. 2) that permits the belt to travel at a speed which is also different from the speeds of the other conveyor belts 15. Moreover, each conveyor belt 15 is provided with a tensioning device 21, that is independent for each conveyor belt, and which acts upon the lower branch of said belt on the inner surface 16 of the belt.

Tensioning device 21 is formed, for example, by an idle roller 22 which is connected to a bracket 23 that is free to oscillate around a fixed shaft 24. Moreover, a spring 25, with its own extremities wrapped around shaft 24, presses, with its central part, on the bracket 23, thus providing it with the tension desired.

The operation of the curing plant for ribbon-like elements, according to this invention, is as follows:

The uncured ribbon-like element 2 arrives from the trimming device 1 where the edges of the uncured ribbon-like element 2 are pared by means of a series of blades. The element 2 wraps around roller 3.

Roller 3 has the function of facilitating the trimming carried out by the device upstream, through an appropriate tensioning of the uncured ribbon-like element 2, and by shifting downwards or upwards it increases or diminishes the length of the uncured ribbon-like element 2 between the trimming device 1 and the device 4.

The conveyor belts 15 of the device 4 cause the uncured ribbon-like element 2 to advance by imparting to the uncured ribbon-like element a velocity that can also be different from the advancing velocity on the inside of the continuous curing machine 6.

Consequently, they also provide the optimum tensioning needed for the longitudinal resistant inserts of the uncured ribbon-like element 2 at the entrance and on the inside of the continuous curing machine 6 after is has passed over the flat rollers carriage 5. Once the vulcanizing has been carried out in the continuous curing machine 6, the vulcanized ribbon-like element 13 is trimmed and wound around the winding rack 14.

When the bobbin on winding rack 14 is full, the cured ribbon-like element 13 is cut, and the part still connected to the plane is put onto a new bobbin.

Since the rotation velocity of the continuous curing machine 6 and the advancing velocity of the uncured ribbon-like element 2 are fixed as a function of the thickness of the uncured ribbon-like element 2 and as a function of the type of elastomeric mixtures used, an appropriate conventional commanding device of the electric type, for example, controls the velocity of the conveyor belts 15 of the device 4 and the positioning of the roller 3 in such a way as to maintain the longitudinal resistant inserts of the uncured ribbon-like element under ideal tensioning conditions at the entrance of the continuous curing machine 6 independently of the upstream conditions of the plant.

This tensioning is obviously obtained by making the continuous curing machine 6 and the conveyor belts 15 of the device 4 run at different velocities.

The conveyor belts 15 of the device 4 are each provided with a tensioning device and they are also commanded separately as regards their rotational velocity in such a way as to make the uncured ribbon-like element 2 advance in a uniform manner. Moreover, if the uncured ribbon-like element 2 tends to shift towards one side, for some reason or other, varing the velocity of the conveyor belts 15 (placed on the side towards which the uncured ribbon-like element 2 tends to shift laterally) lateral drifting of the uncured ribbon-like element 2 is impeded.

The vulcanizing plant for the ribbon-like elements, according to the present invention, makes it possible to obtain its desired advantages because, as results from the preceding description, if carried out with the described plant, the tension in the longitudinal resistant insert members remains constant and of the desired value, no matter what the conditions may be upstream or downstream of the plant so much so that the inserts are not shifted from their ideal position in the vulcanized ribbon-like element 13. In this way waste is avoided.

Moreover, with device 4 comprising a plurality of parallel conveyor belts, the danger of the uncured ribbon-like element 2, drifting laterally can be eliminated since each ribbon is provided with an independent driving device and as a consequence the uncured ribbon-like element 2 advances in a uniform manner and, if necessary, since the velocity for each single conveyor belt can be varied, the uncured ribbon-like element 2 can be returned to the desired position at the entrance of the continuous curing machine 6.

In particular, the installation of the plant of the invention into the production line of ribbon-like elements, as described in Italian Pat. No. 912,586 and the corresponding U.S. application and operating according to the process described in the same patent and in Italian Pat. No. 835,015 and corresponding U.S. application, guarantees that a uniform product will be obtained. In fact, the production line comprising the plant of the present invention provides those quarantees of uniformity and of full response of the finished product to the required requisites that can be obtained only by means of rigorous repetition of the operations on the machine appropriately installed according to meticulous alignments.

As a consequence, there results a continuity of execution that can only be obtained by means of a continuous process which is precisely the one according to which the line works.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A plant for vulcanizing ribbon-like elements comprising:
    a continuous curing machine of the type having a rotating drum;
    a device for continuously feeding an uncured ribbon-like element to the curing machine; and
    a tensioning device between said curing machine and said device, said tensioning device provided with at least one conveyor belt contacting the uncured ribbon-like element in a single flat plane, said conveyor belt travelling at a speed different from that of the continuous curing machine whereby the proper tension and the uniform advancement of the uncured ribbon-like element are obtained.

2. A plant for vulcanizing ribbon-like elements according to claim 1, wherein said tensioning device comprises a plurality of parallel conveyor belts having independent tensioning devices for the recovery of play in said belts and a driving device for moving said belts.